UNITED STATES PATENT OFFICE.

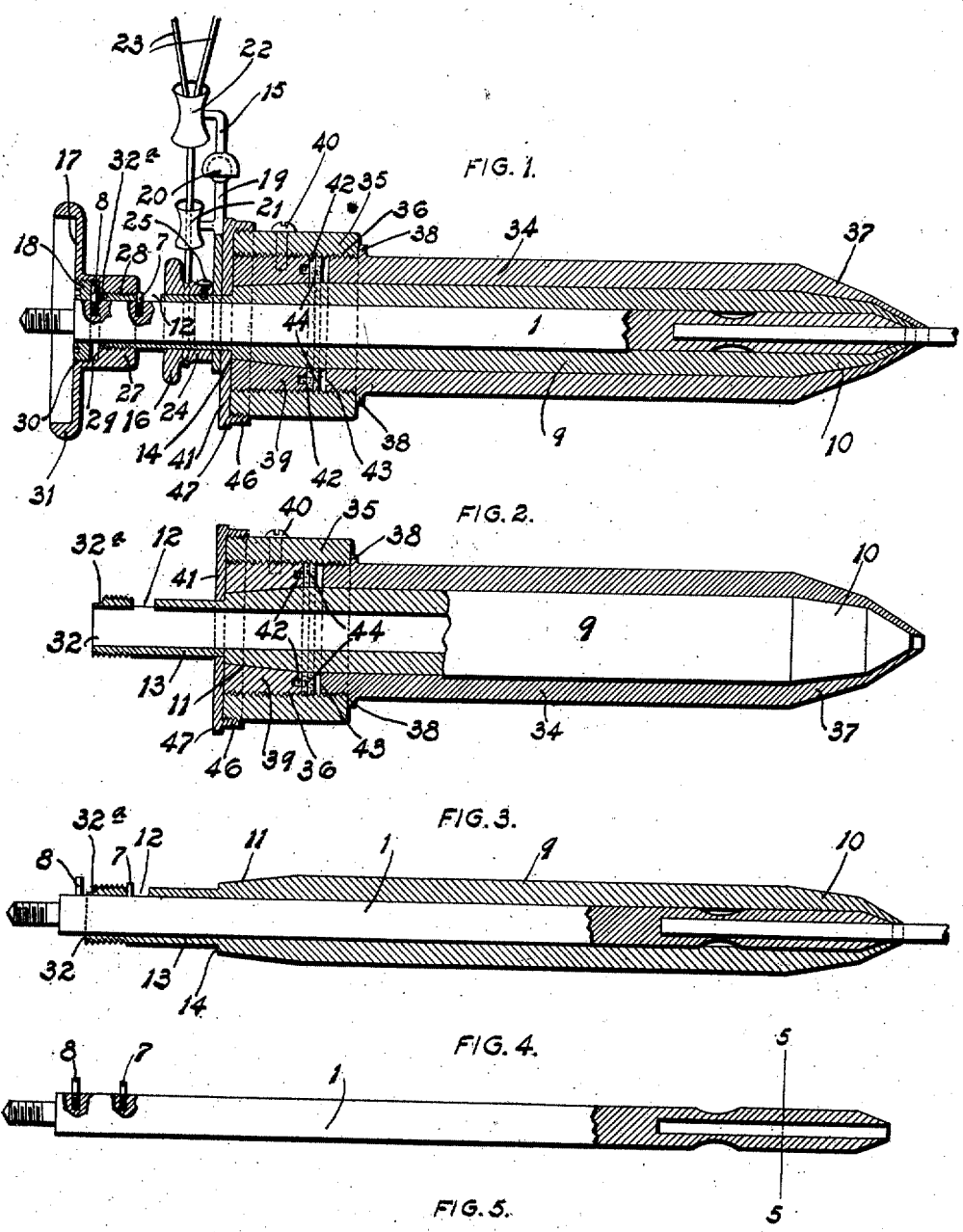

FREDERICK W. DEAN, OF DES MOINES, IOWA.

HANDPIECE FOR DENTAL ENGINES.

984,419.  Specification of Letters Patent.  Patented Feb. 14, 1911.

Original application filed July 28, 1909, Serial No. 445,066. Divided and this application filed February 23, 1910. Serial No. 545,512.

*To all whom it may concern:*

Be it known that I, FREDERICK W. DEAN, a citizen of the United States, residing at Des Moines, in the county of Polk and State of Iowa, have invented certain new and useful Improvements in Handpieces for Dental Engines.

The object of my invention is to provide a handpiece superior to those now in use, less complicated, at less cost, of which the following is a full, clear and accurate description, reference being had to the accompanying drawings and numerals marked thereon, which are a part of this specification.

Figure 1 represents a longitudinal section of the hand-piece all parts assembled. Fig. 2, represents a longitudinal section of the case, the adjustable bearing, the flanged plate, part of the hollow-shaft, and a part of the clutch rod. Fig. 3, represents a longitudinal section of the tool-carrier. Fig. 4, represents a longitudinal section of the clutch rod. Fig. 5, represents a cross section of the clutch. Fig. 4, the said clutch continuous with the rod patented to me May 28, 1907, No. 855,288, is now further provided with the screws 7—8 near the rear end of the rod. Fig. 3, represents the tool-carrier, composed of the said clutch rod, Fig. 4, and the hollow shaft 9.

Said hollow shaft incloses and is fitted to said clutch rod as shown; the front end of said shaft is cone-shaped and is provided with the cone journal 10 formed thereon, and with the cone journal 11, near its rear end, and formed thereon, and with the slot 12 and terminates in the stem 13 reduced in diameter forming a shoulder as at 14. Said stem carries the cord controller 15, Fig. 1, the fixed pulley 16, the sleeve nut 17 and the ring nut 18, its rear end being threaded exteriorly as shown. Straight journals may substitute the cones.

As shown the cord controller comprises in its construction the arms 15—19 connected as at 20 by a ball and socket joint, said arms having right angularly disposed offsets to which are respectively secured the flaring tubes 21—22 complete without joints, through each of which both the ascending and descending lines of the driving cord 23 are passed to the pulley 16, fast on the shaft 9″. The lower end of the arm 19 is fitted loosely on the stem 13 of the shaft 9 next to the rear end of the case, the loose fit permitting free lateral swing thereon, and the ball and socket joint permitting a vibration, whereby the driving cord is held to the pulley whatever the position of the hand-piece. The actuating pulley 16 is provided with the hub 24, is closely fitted to stem 13 and is secured thereto by the set screw 25. The screw 7 projects from said clutch rod, Fig. 3, into the slot 12 of the hollow shaft 9, whereby said clutch rod and shaft are made to rotate together, also permitting said rod to slide to and fro to the extent of the slot. The sleeve nut 17, Fig. 1, consists of the body 27, bored through as at 28, its front end is fitted and threaded interiorly to turn onto the rear end of said hollow shaft as shown; the counter bore in its rear end is enlarged forming an interior shoulder 29, is threaded interiorly as at 30 and is provided with the fingerhold 31. The screw 8, Figs. 1–3–4 projects past the rear end 32 of said hollow shaft into the enlarged bore of said sleeve nut and in contact with the shoulder 29, the space 32 at the end of the hollow shaft permits the screw to be moved forward by the ring nut 18, Fig. 1, which is fitted and threaded exteriorly to turn into the rear end of the said sleeve nut and against the said screw 8 as shown. Turning the sleeve nut on, carries the screws 7—8 and the clutch rod forward with it and forces the nose of the clutch into the countercone of the hollow shaft and closes it on a tool therein; turning the nut off releases the tool. A ring may substitute the screw 8.

The parts 34—35 Fig. 1, constitute the case or shell of the hand-piece and are fitted and threaded to turn together as at 36, the case incloses the tool-carrier, the front end of part 34 being cone shaped as at 37, and fitted interiorly to the coned end and cone journal 10 of the hollow shaft, its rear end being threaded exteriorly as shown and provided with the collar 38. The rear part of the case 35 is enlarged as shown to receive the adjustable bearing 39, and is fitted and threaded interiorly to turn onto the part 34, and is provided with the set screw 40, its rear end is threaded exteriorly to take on the flanged plate 41. It is readily seen that the upper tube of the controller may be dispensed with. Said adjustable bearing 39, patented to me Jan. 28, 1902, No. 691,753 is counter-coned interiorly, is fitted to the cone journal 11 of the hollow shaft, is fitted and threaded exteriorly to turn into the rear end of the part 35 of the case as shown, and is provided with the holes 42 for a spanner wrench, which are reached by turning off part 34 of the case, said bearing compensating for wear of both journals by being turned into the chamber 43 between the front end of the adjustable bearing and the rear end of the front part of the case, provided for the purpose and to accommodate the felt ring 44 for oiling journal 11. The said felt ring is cut from a sheet of felt of such thickness as to not quite fill the chamber 43, is punched centrally to fit closely on the hollow shaft and in the bore of the enlarged rear part of the case.

The circular plate 41 is provided with the annular flange 46 fitted and threaded to turn onto the rear end of the case and bear against the shoulder 14 of the hollow shaft as shown, to prevent jamming of journal 11. Said plate extends beyond the said flange as shown at 47. A ring nut working in the rear end of the case behind the said adjustable bearing may substitute the circular flanged plate.

To clean and oil the bearings, turn off part 34 of the case.

Claims.

1. In a hand-piece for dental engines, the clutch rod provided with projecting screws on its rear end in combination with hollow shaft, and the slot therein, the sleeve nut and the ring nut, substantially as specified.

2. In a hand-piece for dental engines, the combination with a casing having an internal coned bearing at its forward end, a hollow shaft rotatably mounted therein, having an external and an internal bearing at its forward end, provided at its rear end with a reduced slotted stem, and a clutch rod movably fitted in said shaft, and adapted to bear on said internally coned bearing of said shaft, screws secured in the rear end of said rod adapted to engage said shaft and limit the longitudinal movement of said rod, of a ring nut and a sleeve nut adjustably mounted on said stem and constructed to engage said screws, whereby said clutch rod may be moved into or out of engagement with the internally coned bearing of the shaft to clutch or release a dental tool.

3. In a hand piece for dental engines, the combination with a casing having an internal coned bearing at its forward end and having an internal coned bearing adjustably fitted in its rear end, a hollow shaft rotatably mounted in said case and having an internal and an external coned bearing at its forward end, having its apex directed forward, and an external coned journal near its rear end, having its apex directed rearward and fitted to bear in said adjustable bearing, a clutch rod movably fitted in said shaft and adapted to bear on said internally coned bearing of said shaft, screws secured in the rear end of said rod, adapted to engage said shaft and limit the longitudinal movement of said rod, of a ring nut and a sleeve nut adjustably mounted on said stem and constructed to engage said screws, whereby said clutch rod may be moved into or out of engagement with the internally coned bearing of the shaft to clutch or release a dental tool, substantially as specified.

4. In a hand piece for dental engines the combination with the casing and a hollow shaft rotatably mounted therein, and a pulley mounted thereon, of a cord controller comprising arms having offsets, flaring tubes carried by the respective arms, a ball and socket joint connecting said arms, one of which is loosely mounted on said shaft, substantially as specified.

5. In a hand piece for dental engines, the combination with a hollow shaft having a rearwardly extending slotted stem, and a clutch rod mounted for longitudinal movement therein, projecting screws on said rod to limit said movement, of a counter bored sleeve nut having a screw engagement with said shaft and provided with a finger hold, a ring nut threaded into said counter bore and into engagement with the screw 8, the other of said screws projecting through the slot in said stem and into contact with the inner end of said sleeve nut, whereby said clutch rod may be moved into and out of engagement with the forward end of said shaft to grip and hold a dental tool or release the same.

6. In a hand-piece for dental engines the combination with a two-part casing and hollow shaft rotatably mounted therein and provided at its rear end with a coned journal bearing, a stem and shoulder, of a circular flanged plate loosely mounted on said stem and constructed to adjustably engage the rear portion of said case and adapted to bear against said shoulder whereby said coned journal is prevented from wedging substantially as specified.

7. In a handpiece for dental engines the felt ring in combination with the hollow shaft having the rear journal thereon, the adjustable bearing and the case, substantially as specified.

FREDERICK W. DEAN.

Witnesses:
M. F. DEAN,
L. K. SHANNON.